United States Patent [19]

Sato

[11] Patent Number: 5,282,025

[45] Date of Patent: Jan. 25, 1994

[54] CHROMA SIGNAL MATRIX CIRCUIT FOR A COLOR CCD CAMERA

[75] Inventor: Yasushi Sato, Kanagawa, Japan

[73] Assignee: Sony Corporation, Tokyo, Japan

[21] Appl. No.: 818,532

[22] Filed: Jan. 9, 1992

[30] Foreign Application Priority Data

Jan. 11, 1991 [JP] Japan .................................. 3-013746

[51] Int. Cl.$^5$ .......................... H04N 9/07; H04N 9/77
[52] U.S. Cl. ........................................ 358/44; 358/43; 358/30
[58] Field of Search ........................ 358/41, 43, 44, 48, 358/30, 36, 37, 29, 213.15, 213.18; H04N 9/04, 9/07, 9/77

[56] References Cited

U.S. PATENT DOCUMENTS

| 4,591,900 | 5/1986 | Heeb et al. | 358/43 |
| 4,688,085 | 8/1987 | Imaide | 358/43 |
| 4,714,955 | 12/1987 | Nishimura et al. | 358/43 |
| 4,903,122 | 2/1990 | Ozaki et al. | 358/44 |

FOREIGN PATENT DOCUMENTS

| 0357001 | 3/1990 | European Pat. Off. |
| 0391281 | 10/1990 | European Pat. Off. |

Primary Examiner—James J. Groody
Assistant Examiner—Michael H. Lee
Attorney, Agent, or Firm—Hill, Steadman & Simpson

[57] ABSTRACT

The present invention is directed to a chroma signal processing circuit for a single-chip color camera in which the level of a color aliasing signal generated when a signal having a vertical spatial frequency $\frac{1}{2}$ Py becomes incident can be reduced considerably. In a single-chip color camera having a solid state imager capable of separately reading out image informations of all pixels and a color filter array having a color array pattern having a fundamental lattice in which two color filters are repeatedly formed in the horizontal and vertical directions and two color filters having the same spectral characteristic are provided within this unit lattice, the color filter array provided on the solid state imager, when primary color signals R, G and B are separated, then two kinds of primary color signals with respect to one primary color signal are generated for two color difference signals and an adding ratio of the two kinds of primary color signals is controlled in such a manner that the level of a sampling carrier generated in the vertical spatial frequency is minimized.

5 Claims, 4 Drawing Sheets

FIG. 2A

| A | B |
|---|---|
| A | C |

FIG. 2B

| A | B |
|---|---|
| C | A |

FIG. 3A

| Ye | Mg |
|----|----|
| Ye | Cy |

FIG. 3B

| Ye | Mg |
|----|----|
| Cy | Ye |

| Cy | Mg |
|----|----|
| Cy | Ye |

FIG. 4B

| Cy | Mg |
|----|----|
| Ye | Cy |

FIG. 5A

| Mg | Ye |
|----|----|
| Mg | Cy |

FIG. 5B

| Mg | Ye |
|----|----|
| Cy | Mg |

CHROMA SIGNAL MATRIX CIRCUIT FOR A COLOR CCD CAMERA

BACKGROUND OF THE INVENTION

1. Field of the Invention

The present invention generally relates to a chroma signal matric circuit for a color CCD camera and, more particularly, to a chroma signal matrix circuit using a solid state imager element which can separately read out image informations of all pixels.

2. Description of the Related Art

In the single-chip color camera, a color filter array is provided on a single solid state imager in order to generate a color signal by the single solid state imager. Japanese Laid-Open Open Patent Publication No. 60-62789, for example, describes this kind of a single-chip color camera which employs a color filter array in which color filters are repeatedly arrayed at every two pixels in the scanning direction, a coefficient is set such that a difference between a signal corresponding to the first or second pixel and a signal corresponding to the first pixel and which is multiplied with the coefficient is reduced to zero at a white portion of an object and the above difference is added to or subtracted from the signal corresponding to each of the first and second pixels, thereby correcting a color aliasing signal (i.e., color aliasing signal caused by a line-sequential color filter) generated in a slanted line or boundary between colored portions.

In the single-chip color camera according to the prior art, however, although the color aliasing signal generated on the slanted line and the boundary between the colored portions can be corrected, the calculation processing between the pixels in the vertical direction must be carried out constantly when color difference signals are generated. As a result, assuming that Py represents the pitch between pixels in the vertical direction, when the cameraman takes a picture of an image having a component of a vertical spatial frequency $\frac{1}{2}$ Py, then a large color aliasing signal occurs. No consideration has been made on the correction of this kind of the color aliasing signal.

OBJECTS AND SUMMARY OF THE INVENTION

Therefore, it is a general object of the present invention to provide an improved chroma signal processing circuit for a single-chip color camera in which the aforesaid shortcomings and disadvantages encountered with the prior art can be eliminated.

More specifically, it is an object of the present invention to provide a chroma signal processing circuit for a single-chip color camera in which a level of a color aliasing signal generated when a signal of a vertical spatial frequency $\frac{1}{2}$ Py is incident can be reduced considerably.

As an aspect of the present invention, in a single-chip color camera having a solid state imager capable of separately reading out image informations of all pixels and a color filter array having a color array pattern having a fundamental lattice in which two pixels are repeatedly formed in the horizontal and vertical directions and two pixels having the same spectral sensitivity characteristic are provided within this unit lattice, the color filter array provided on the solid state imager, a chroma signal processing circuit for a single-chip color camera is comprised of a first calculating circuit for processing a first chroma signal provided by adding respective chroma signals of two pixels having the same spectral characteristic of respective chroma signals of four pixels of the unit lattice obtained from an output signal of the solid state imager by a predetermined ratio and other second and third chroma signals to provide two primary color signals and two kinds of one primary color signal, a second calculating circuit for processing the respective two primary color signals and two kinds of one primary color signal to provide two color difference signals, and a control circuit for controlling the predetermined ratio such that a level of sampling carrier generated in a vertical spatial frequency is minimized in the two color difference signals.

According to the chroma signal processing circuit of the present invention, of the respective chroma signals of four pixels arranged in the unit lattice, the respective chroma signals of two pixels having the same spectral characteristic are added by a predetermined ratio to provide a first chroma signal. Then, the first chroma signal and other second and third chroma signals are processed to provide two primary color signals and two kinds of one primary color signal. Further, the two primary color signals and the two kinds of one primary color signals are respectively processed to provide two color difference signals. In that case, the above ratio is controlled such that the level of sampling carrier generated in the vertical spatial frequency is minimized in the two color difference signals. As a consequence, a color aliasing signal generated when the signal of vertical spatial frequency becomes incident can be reduced considerably.

BRIEF DESCRIPTION OF THE DRAWINGS

A better understanding of other objects, features, and advantages of the present invention will be gained from a consideration of an illustrative embodiment thereof, in conjunction with the accompanying drawings, in which:

FIGS. 2A and 2B are respectively diagrams used to explain the array pattern of color filters used in the present invention;

FIGS. 3A and 3B are respectively diagrams showing examples of array pattern of a color filter used in the present invention more concretely;

FIGS. 4A and 4B are respectively diagrams showing other examples of array pattern of a color filter used in the present invention;

FIGS. 5A and 5B are respectively diagrams showing further examples of array pattern of a color filter used in the present invention.

DESCRIPTION OF THE PREFERRED EMBODIMENT

An embodiment of the present invention will hereinafter be described in detail with reference to the drawings.

Figure 1:
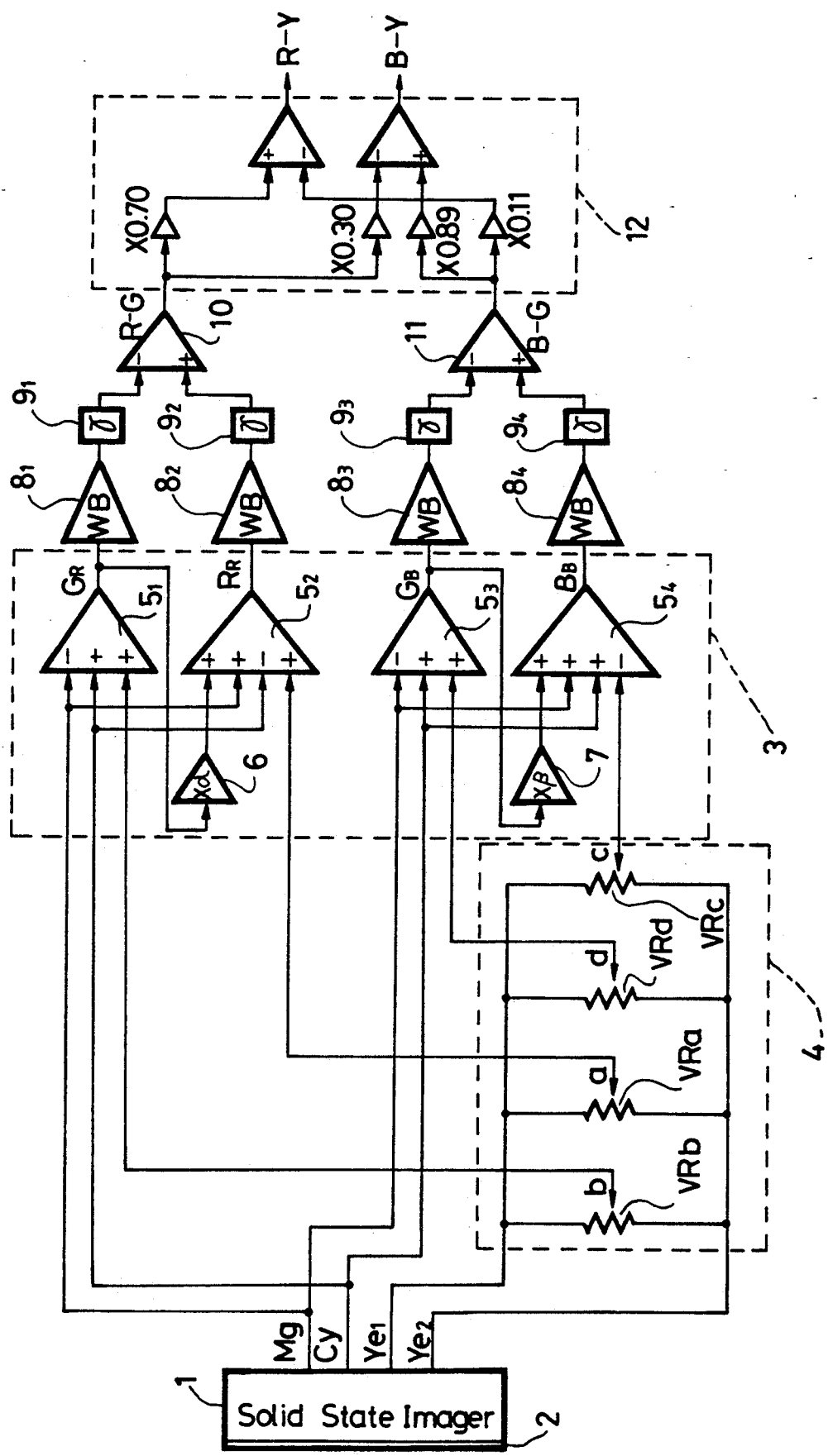
FIG. 1 is a block diagram showing a chroma signal processing circuit according to an embodiment of the present invention.

FIG. 1 shows a block diagram of the chroma signal processing circuit for a single-chip color camera according to the embodiment of the present invention.

Referring to FIG. 1, a solid state imager 1 is provided and this solid state imager 1 is what might be called an all pixel separately read out type capable of reading out image informations of all pixels separately. A color filter array 2 is provided on the solid state imager 1 and color filters of this color filter array 2 are arranged at a basic repetitive cycle of 2 color filters in the horizontal direction and 2 color filters in the vertical direction and also by three kinds of color filters "A", "B", "C". In this event, as the array pattern of the color filters "A", "B" and "C", a stripe line sequential system in which the same color filters are arrayed in a stripe fashion as shown in FIG. 2A and a mosaic line sequential system in which the same color filters are arrayed in a mosaic fashion as shown in FIG. 2B are employed in order to obtain a high resolution of the color camera system in the vertical direction.

In the array patterns of color filters according to the stripe line sequential system and the mosaic line sequential system shown in FIGS. 2A and 2B, the three color filters "A", "B", "C" (each of which corresponds to each pixel) are replaced with complementary color filters of "Ye (yellow)", "Mg (magenta)" and "Cy (cyan)" as shown in FIGS. 3A, 3B through FIGS. 5A, 5B. In this embodiment, as the color filter array 2, a Ye mosaic as shown in FIG. 3B, and Mg, Cy line sequential type color filter array shown in FIGS. 5A and 4A are utilized. The solid state imager 1 having the color filter array 2 derives two outputs $Ye_1$ and $Ye_2$ of color Ye with respect to the unit lattice and therefore outputs four chroma signals corresponding to the colors of respective pixels. Of these four chroma signals, the chroma signals of the colors Mg, Cy are directly supplied to a primary color separating matrix circuit 3 while the chroma signals of the colors $Ye_1$, $Ye_2$ are processed by a color aliasing signal suppressing control circuit 4 and then supplied to the primary color separating matrix circuit 3. The color aliasing signal suppressing circuit 4 comprises four variable resistors VRa, VRb, VRc and VRd in order to set constants a, b, c and d which will be described more fully later and determines adding ratios of the respective chroma signals $Ye_1$ and $Ye_2$ by selecting the constants a to d.

The primary color separating matrix circuit 3 is adapted to separate three primary color signals R (red), G (green) and B (blue) from the three chroma signals of the colors Ye, Cy and Mg. In the primary color separating matrix circuit 3, in order to separate the three primary color signals R, G, B from the respective chroma signals of the colors Ye, Cy and Mg, an ideal relation between the chroma signals of the colors Ye, Cy, Mg and the three primary color signals R, G, B is expressed by the following equation (hereinafter referred to as an equation (A)) expressed as:

$$Ye = R + G \atop Cy = B + G \atop Mg = R + B \Biggr\} \quad (\text{A})$$

Accordingly, the three primary color signals R, G, B can be obtained by the calculation based on the following equation (hereinafter referred to as an equation (B)):

$$R = (Ye + Mg - Cy)/2 \atop G = (Ye + Cy - Mg)/2 \atop B = (Mg + Cy - Ye)/2 \Biggr\} \quad (\text{B})$$

In this embodiment, since the two outputs $Ye_1$ and $Ye_2$ are output with respect to the color Ye in the unit lattice, we can obtain primary color signals of exactly the same spectral sensitivity characteristic by calculating the three primary color signals from the following equations (hereinafter referred to as an equation (C)) expressed as:

$$\begin{aligned} R_R &= \{aYe_1 + (1-a)Ye_2 + Mg - Cy\}/2 & \ldots (1) \\ G_R &= \{bYe_1 + (1-b)Ye_2 + Cy - Mg\}/2 & \ldots (2) \\ B_B &= \{Mg + Cy - cYe_1 - (1-c)Ye_2\}/2 & \ldots (3) \\ G_B &= \{dYe_1 + (1-d)Ye_2 + Cy - Mg\}/2 & \ldots (4) \end{aligned} \Biggr\} \quad (\text{C})$$

That is, from a spectral sensitivity characteristic standpoint, even when the constants a through d in the above-mentioned equation (C) are selected to be arbitrary values, then $R_R = R$, $G_R = G = G_B$, $B_B = B$ are established among the respective primary color signals on the equation (B) and the respective primary color signals on the equation (C).

The primary color separating matrix circuit 3 comprises an adder-subtracter $5_1$ for calculating the equation (2) on the equation (C), an adder-subtracter $5_2$ for calculating the equation (1), an adder-subtracter $5_2$ for calculating the equation (4) and an adder-subtracter $5_4$ for calculating the equation (3). Further, in the actual color filter, spectral characteristics of the respective pixels corresponding to the colors Ye, Cy and Mg are not ideal so that the respective chroma signals of the colors Ye, Cy and Mg cannot be expressed by the foregoing equation (A) simply. For this reason, if the respective primary color signals R, G and B are generated in accordance with the foregoing equation (A), a spectral sensitivity characteristic of the red primary color signal R on the short wavelength side thereof and a spectral sensitivity characteristic of the blue primary color signal B on the long wavelength side thereof are not made flat, resulting in color reproducibility being deteriorated. To solve this problem, in the primary color separating matrix circuit 3, the signal $G_R$ derived as the output of the adder-subtracter $5_1$ is input to the adder-subtracter $5_2$ through a compensator 6 having a constant $\alpha$ as one adding input signal, the signal $G_B$ derived as the output of the adder-subtracter $5_3$ is input to the adder-subtracter $5_4$ through a compensator 7 having a constant $\beta$ as one adding input signal and the mixing ratio of the signals $G_R$, $G_B$ is selected by setting the constants $\alpha, \beta$ to proper values, thereby the deterioration of color reproducibility of the red primary color signal R on the short wavelength side thereof and of the blue primary color signal B on the long wavelength side thereof being suppressed.

Of the respective primary color signals $G_R$, $R_R$, $G_B$ and $B_B$ separated by the primary color separating matrix circuit 3, the primary color signal $G_R$ is supplied through a white balance amplifier $8_1$ and a gamma ($\gamma$) correction circuit $9_1$ to a subtracter 10 as a subtracting input, the primary color signal $R_R$ is supplied through a white balance amplifier $8_2$ and a gamma correction circuit $9_2$ to the subtracter 10 as a subtracted input, the primary color signal $G_B$ is supplied through a white balance amplifier $8_3$ and a gamma correction circuit $9_3$ to a subtracter 11 as a subtracting input and the primary color signal $B_8$ is supplied through a white balance amplifier $8_4$ and a gamma correction circuit $9_4$ to the subtracter 11 as a subtracted input. The white balance amplifiers $8_1$ to $8_4$ and the gamma correction circuits $9_1$ to $9_4$ might be formed of conventional ones. The subtracter 10 is used to obtain a color difference signal (R−G) and the subtracter 11 is used to obtain a color difference signal (B−G), respectively.

These two color difference signals (R−G) and (B−G) are supplied to a color difference matrix circuit 12 at the next stage. The color difference matrix circuit 12 processes the color difference signals (R−G) and (B−G) to provide color difference signals (R−Y) and (B−Y) of color television format on the basis of the following equations:

$$R-Y = 0.70 (R-G) - 0.11 (B-G)$$

$$B-Y = 0.89 (B-G) - 0.30 (R-G)$$

These resultant color difference signals (R−Y) and (B−Y) are supplied to an encoder (not shown) which derives an NTSC television signal.

With the above-mentioned arrangement, as shown in FIG. 3B, Py assumes a pitch of pixels (color filters) in the vertical direction. When the color difference signal (R−G) is generated, the primary color signals $R_R$, $G_R$ are generated by selecting the constants a and b, which determine the adding ratio of the respective chroma signals of the colors $Ye_1$, $Ye_2$, by the variable resistors VRa, VRb of the color aliasing signal suppressing control circuit 4 in such a fashion that the level of sampling carriers of the primary color signals $R_R$, $G_R$ exiting in a vertical spatial frequency ½ Py is reduced to zero. Further, the color difference signal (b−G) is generated, the primary color signals $B_B$, $G_B$ are generated by selecting the constants c and d by the variable resistors VRc and VRd in such a fashion that the level of the sampling carriers of the primary color signals $B_B$, $G_B$ is reduced to zero.

As described above, when the primary color signals R, G and B are separated, two kinds of G signals $G_R$, $G_B$ are generated for two color difference signals (R−$G_R$) and (B−$G_B$) and also the primary color signals $R_R$, $G_R$, $B_B$ and $G_B$ are generated such that the level of the sampling carrier generated in the vertical spatial frequency ½ Py is minimized in the two color difference signals (R−$G_R$) and (B−$G_B$), thereby making it possible to considerably reduce the color aliasing signal generated when the signal having the vertical spatial frequency ½ Py becomes incident.

Figure 6:
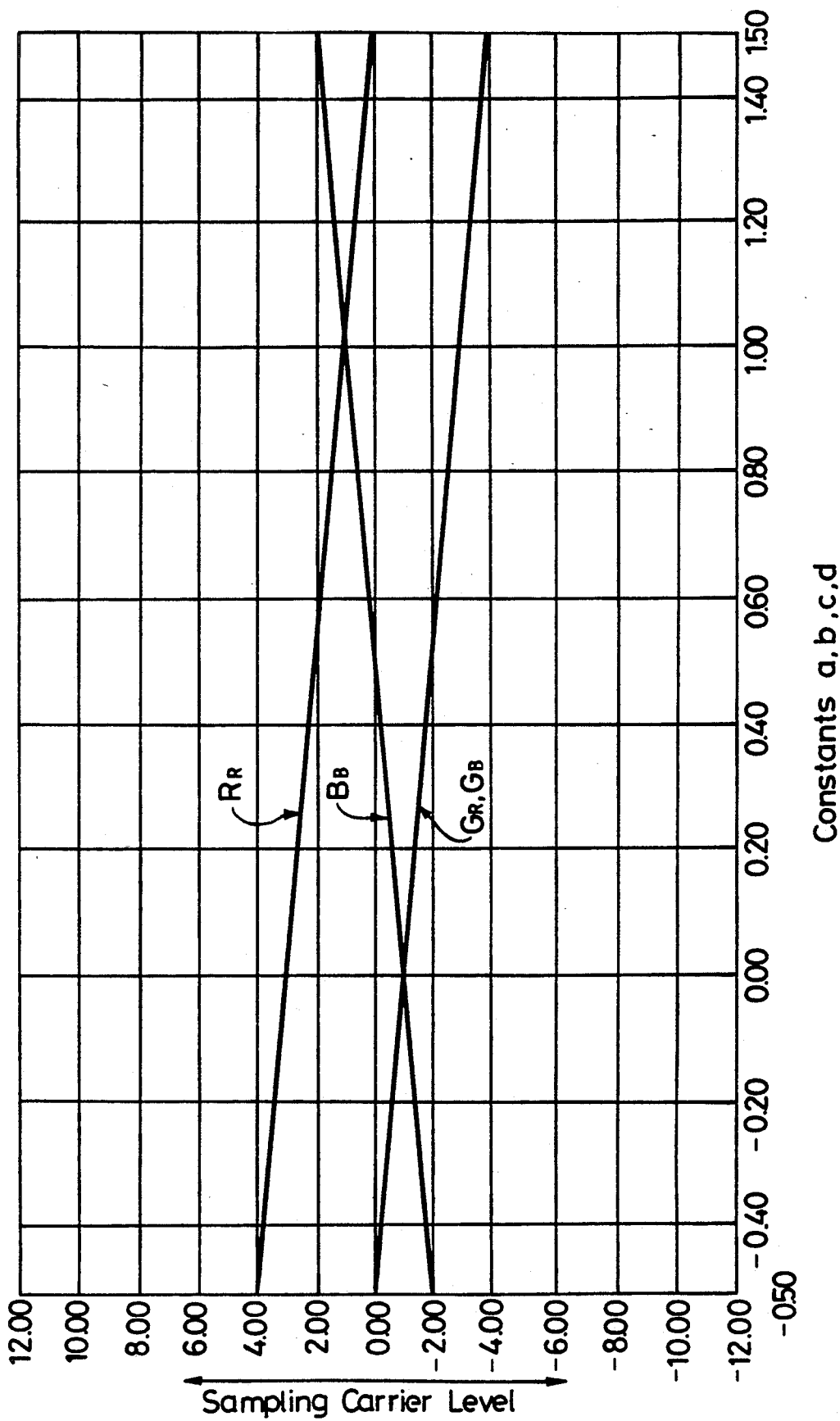
FIG. 6 is a characteristic graph to which references will be made in explaining a relation between constants a through d and a sampling carrier level generated in a vertical direction frequency $\frac{1}{2}$ Py of primary color signals $R_R$, $G_R$ and $G_B$.

FIG. 6 shows the levels of sampling carriers of vertical spatial frequency ½ Py generated in the primary color signals $R_R$, $G_R$, $B_B$, $G_B$ when the constants a through d are varied in a range of −0.5 through +1.5. In this case, when a = 1.5 and b = −0.5, the level of the sampling carrier generated in the color difference signal (R−G) becomes zero. Further, when c=0 and d=0, the level of the sampling carrier generated in the color difference signal (B−G) becomes zero so that the level of the color aliasing signal is minimized.

FIG. 6 shows a variety of levels of sampling carriers when the foregoing equation (A) is established. In the actual solid state imager, the values on FIG. 6 are changed with the spectral characteristics of a light source, color filter elements or the like. Particularly, when a color temperature of a light source is changed, the values are changed remarkably and combinations of the constants a through d which can suppress the occurrence of the color aliasing signal most are changed. Therefore, in the color aliasing signal suppressing control circuit 4, the signal processing having the minimum color aliasing signal may be performed by dynamically varying the values of the constants a through d in response to the change of the color temperature.

As set out above, according to the chroma signal processing circuit of the present invention, when the primary color signals R, G and B are separated, two kinds of primary color signals with respect to one primary color signal are generated for the two color difference signals and the respective primary color signals are generated by controlling the adding ratio of the two kinds of primary color signals such that the level of the sampling carrier generated in the vertical spatial frequency is minimized in the two color difference signals. There is then the advantage such that the color aliasing signal generated when the signal of the vertical spatial frequency becomes incident can be reduced considerably.

Having described the preferred embodiment of the invention with reference to the accompanying drawings, it is to be understood that the invention is not limited to that precise embodiment and that various changes and modifications thereof could be effected by one skilled in the art without departing from the spirit or scope of of the invention as defined in the appended claims.

What is claimed is:

1. A chroma signal processing circuit for a single-chip color camera having a solid state imager capable of separately reading out image informations of all pixels and a color filter array having a color array pattern having a fundamental lattice in which two pixels or color filters are repeatedly formed in the horizontal and vertical directions and two pixels or color filters having the same spectral sensitivity characteristic are provided within this unit lattice, the color filter array being provided on said solid state imager, said chroma signal processing circuit for a single-chip color camera comprising:

(a) calculating means for processing respective chroma signals of four pixels of said unit lattice obtained from an output signal of said solid state imager, a first chroma signal provided by adding respective chroma signals of two pixels having the same spectral sensitivity characteristic in a predetermined ratio and other second and third chroma signals, to provide two primary color signals and two kinds of a third primary color signal;

(b) second calculating means for processing each of said two primary color signals and each of said two kinds of third primary color signal to provide two color difference signals; and (c) control means for controlling said predetermined ratio such that a level of sampling carrier generated in a vertical spatial frequency is minimized in said two color difference signals.

2. The chroma signal processing circuit for a single-chip color camera according to claim 1, wherein said first, second and third chroma signals are respectively Ye signal, Mg signal and Cy signal.

3. The chroma signal processing circuit for a single-chip color camera according to claim 2, wherein said two primary color signals are $R_R$ signal and $B_B$ signal and said two kinds a third primary signal are $G_R$ and $G_B$ signals.

4. The chroma signal processing circuit for a single-chip color camera according to claim 3, wherein said two color difference signals are respectively (R−Y) signal and (B−Y) signals.

5. The chroma signal processing circuit for a single-chip color camera according to claim 1, wherein said control means controls said ratio in response to the change of a color temperature of a light source.

* * * * *